R. CORN.
SCARF PIN RETAINER.
APPLICATION FILED NOV. 20, 1911.
1,027,525.
Patented May 28, 1912.
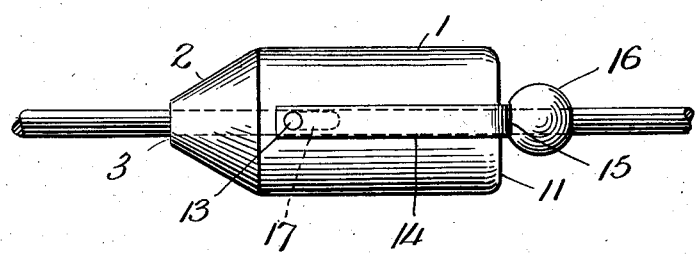
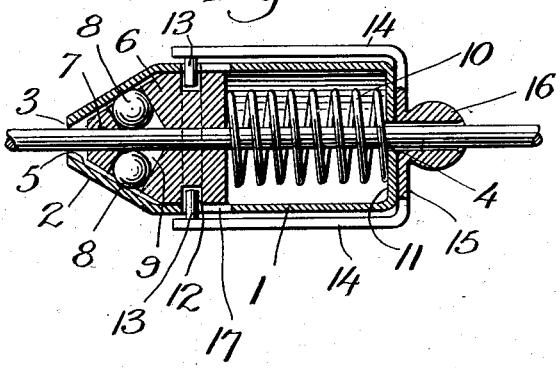
WITNESSES
INVENTOR
BY
ATTORNEY

UNITED STATES PATENT OFFICE.

ROBERT CORN, OF NEW YORK, N. Y.

SCARF-PIN RETAINER.

1,027,525.  Specification of Letters Patent.  Patented May 28, 1912.

Application filed November 20, 1911. Serial No. 661,402.

*To all whom it may concern:*

Be it known that I, ROBERT CORN, a citizen of the United States, residing in the city of New York, borough of Manhattan, in the county and State of New York, have invented a new and useful Scarf-Pin Retainer, of which the following is a specification.

My invention relates to scarf pin retainers in which means are provided to automatically grip and retain a scarf pin in the scarf of a user, and prevent the pin from becoming loose or from being surreptitiously removed from the scarf, and has for its primary object to provide means for readily and positively releasing the gripping devices of the retainer from the scarf pin.

Other objects relating to the specific elements constituting my invention are hereinafter more particularly set forth.

These objects I attain by the means illustrated in the accompanying drawings, in which similar characters of reference indicate corresponding parts throughout the several views, and in which, Figure 1 is a side elevation of a scarf pin retainer embodying my invention. Fig. 2 is a vertical transverse section, taken on the axial line of said retainer, showing part of the device in side elevation.

As illustrated in the drawing, 1 represents a casing, preferably reduced in diameter at one end 2, and made conical in outline. The casing is provided with an insertion opening 3, on one end, and on the opposite end with a corresponding opening 4, adapted to receive a scarf pin. The reduced end of the casing is provided with an inclined inner wall 5. A head 6 is arranged within the casing, and is preferably formed conical in outline and provided with a central aperture 7 to receive a scarf pin. Gripping devices 8 are mounted on the head 6, and arranged within apertures 9 formed in said head. These apertures extend laterally through the wall of the head 6, so as to allow the gripping devices 8 to project slightly into the central aperture 7 of the head and grip a scarf pin, and also to bear against the inclined wall 5 so as to force said gripping devices 8 inward to bear against said pin. The head 6 is supported on a spring 10, which bears preferably at its lower end against the end wall 11 of the casing, and said spring normally presses said head toward the reduced end of the casing, so as to press the gripping devices inward toward the central aperture 7. The head 6 is also preferably provided with an annular groove 12, adapted to receive projections 13 that are formed on or attached to the arms of a yoke 14. The arms of said yoke extend longitudinally of said casing and are connected by a cross bar extending transversally of the end wall 11 of said casing and provided with an aperture adapted to receive a scarf pin. The middle portion of the cross bar of the yoke is preferably provided with an apertured knob 16 for the purpose of operating said yoke. The casing is also provided on opposite sides with slots 17 adapted to receive the projections 13 of the arms of the yoke 14, so as to enable said yoke to be connected with the head 6 and moved longitudinally of the casing. By means of said yoke the head 6 is gripped at opposite sides thereof, and an even downward pull may be thereby exerted on said head so as to enable the gripping devices 8 to be released evenly from the scarf pin, and prevent the gripping devices from binding on the scarf pin, as sometimes happens when the head holding the gripping devices is operated by a stem attached centrally to said head.

When the device is in use, the casing may be gripped by the fingers of the user between the arms of the yoke, and the point of a scarf pin inserted through the aperture 3 and into the central aperture 7 of the head 6. The gripping devices 8 being normally pressed inward by the spring 10, force the head 6 toward the inclined wall 5 of the reduced end of the cylinder, and thereby cause said gripping devices to project into the central aperture 7. As pressure is applied to the pin, however, the head 6 is moved inward against the tension of the spring 10 until the gripping devices come into a wider part of the reduced end of the casing, and permit said gripping devices to move outwardly so as to admit the pin. The pin is then pressed through the head 6, and the opening 4 on the opposite end of the casing, and through an aperture 18 formed in the head or knob 16 attached to said yoke. After the retainer has been properly placed on the pin, the spring 10 forces the head 6 back into its normal position and causes the gripping devices 8 to press against the inclined wall 5 of the casing, thereby forcing the gripping devices inward to grip the pin and prevent the pin from being withdrawn from the retainer.

It is evident that if an effort be made to pull the pin out of the retainer, the head 6 will be brought farther inward against the inclined wall 5 of the casing, and thereby cause the gripping devices to take a stronger hold upon the pin. When it is desired to remove the retainer from the pin, the knob 16 of the yoke may be gripped by the fingers of the user and pulled downward, while the casing is held in position. The downward pull on the knob 16 of the yoke carries downward the head 6, thereby pressing the gripping devices into a wider portion of the casing, and releasing their hold upon the pin. During the downward movement of the head, the projections 13 of the yoke move in the slots 17 of the casing. After the pin has been removed from the retainer, the spring 10 forces the head 6 inward into its initial position.

What I claim and desire to secure by Letters Patent is:

A scarf pin retainer having a casing provided with slots extending longitudinally thereof, an inclined inner wall and an insertion aperture adjacent thereto, and an opposite end wall having an aperture formed therein to receive a scarf pin, a head having an annular groove, and gripping devices mounted in said head adapted to bear against a scarf pin and against the inclined wall of said casing, a spring within said casing to press said head against said inclined wall, and a yoke comprising arms extending longitudinally of said casing and a cross bar extending transversely of the end wall of said casing, the said cross bar being provided with an aperture in line with the aperture of the end wall of said casing, and the ends of said yoke being provided with projections to engage the groove of said head and the slots of the casing.

ROBERT CORN.

Witnesses:
JAMES A. BLANCHFIELD,
MATTHEW S. WHELAN.

---

Copies of this patent may be obtained for five cents each, by addressing the "Commissioner of Patents, Washington, D. C."